106. COMPOSITIONS, COATING OR PLASTIC
99

Patented July 6, 1943

2,323,835

UNITED STATES PATENT OFFICE 2,323,835

CEMENT-ASBESTOS SHINGLE AND LIKE PRODUCT

Philip Mooney, Cleveland Heights, Ohio, assignor to Medusa Portland Cement Company, Cleveland, Ohio, a corporation of Ohio No Drawing. Application March 3, 1942, Serial No. 433,120

8 Claims. (Cl. 106—99)

My present invention relates to cement-asbestos shingles and like products and aims to provide certain improvements therein.

In the manufacture of cement-asbestos products, whether made by the wet or the dry process, it is conventional practice to add filler material to the mixture to replace a considerable percentage of the more costly Portland cement. However, since all Portland cements have not the same composition, certain brands permit of the use of a greater amount of filler material than do others.

Heretofore, various substances have been used as filler materials and their use has been governed to a great extent by their availability, physical and chemical characteristics and cheapness. As an example of one such filler material which has been extensively used in the manufacture of cement-asbestos shingles and like products may be mentioned fly ash. This substance is the ash from pulverized coal which is burned under the boiler of a power plant, and which fly ash is removed from the waste gases by dust collecting devices such as electric precipitators. Such fly ash is composed essentially of silica and alumina and is wholly inert in so far as having any controlling effect upon the setting or hardening of cement-asbestos products of the kind here under consideration. So far as I am aware all other filler materials heretofore used have also been inert and have had no effect upon the setting or hardening of cement-asbestos products, which setting or hardening had to be controlled by varying the percentage of the Portland cement used.

I have found that cement mill flue dust which is available in large quantities as a by-product in the manufacture of Portland cement offers a filler material cheaper than and superior to those filler materials heretofore used in the manufacture of cement-asbestos products. The superiority of cement mill flue dust as a filler material flows from the fact that such flue dust does not consist essentially of silica and alumina as does fly ash, but on the contrary also contains a large percentage of partially and completely burned limestone which is in the form of calcium oxide or unslaked lime. This unslaked lime when mixed with water in the process of making cement-asbestos products, becomes slaked and develops a certain amount of heat in so doing. However, strictly speaking, slaked or unslaked lime in its pure form does not have hydraulic properties. It is the heating of the lime with small amounts of silica that develops the hydraulic properties, and the dust also has some feeble hydraulic properties, that is, the property of setting or hardening while in contact with water or moisture. Accordingly, by using such cement mill flue dust which would be active as a filler material, more of said filler material could be used than an inert filler. Furthermore, because of its activity, the setting or hardening of the shingles or like products could be controlled by using greater or lesser quantities of such filler material and thereby provide a saving in the amount of Portland cement ordinarily used therein.

In order that it may be clearly understood as to what is meant by cement mill flue dust as herein applied to a filler material for use in the manufacture of cement-asbestos products, a brief statement is here given as to how this cement mill flue dust is obtained as a by-product in the manufacture of Portland cement.

In the manufacture of Portland cement the pulverized raw material consisting of limestone and clay usually is introduced at one end of a cement kiln and flows slowly by gravity toward the other end which discharges the finished clinker. At the discharge end is the flame that creates the heat for the burning of the clinker. The gases from this burning proceed against the current of the raw material and go out of the feed end of the kiln. These gases carry with them a quantity of the pulverized raw material as well as the residue from the fuel or ash from the powdered coal if used as fuel. In many cement plants these gases pass through a boiler where the heat is absorbed to make steam, and thence proceed through ducts to a stack which discharge them to the air. During the passage from the end of the kiln to the stack much of the entrained pulverized raw material dust and residue from the fuel that is carried by the gases settles out due to gravity and has the general name of flue dust. It is usually gathered up and introduced again into the raw material and reintroduced into the kiln and is therefore a partially processed raw material for the manufacture of cement clinker. The very finest of the particles, however, do not drop out of the gas stream by gravity and it is necessary to introduce devices such as electric precipitators to collect them. The dust collected by such devices is therefore called precipitator dust. If other dust collecting devices are used the dust is often called collector dust. It is, of course, a part of the flue dust, although it is finer than the average and may vary somewhat from the remainder of the flue dust in its chemical composition. Accordingly, the cement mill flue dust as referred to in the present specification may include wholly or in part the flue dust which is carried by the gases and settles out due to gravity, the so-called precipitator dust and the so-called collector dust.

Although my present invention does not specifically deal with the steps in the manufacture of cement-asbestos products, it does relate to the method of making such cement-asbestos products where the addition of cement mill flue dust as filler material aids in controlling the setting or hardening of the products.

My invention also contemplates specific compositions of matter which include cement mill flue dust as an active filler material in the manufacture of cement-asbestos products. Broadly considered, such compositions comprise a thorough intimate mixture of Portland cement, asbestos fibres and cement mill flue dust in various proportions. In some instances the amount of flue dust could equal the amount of cement or even exceed it. However, in other cases where for some reason particularly high strengths are desired, it would be still worth while to use the flue dust in amounts as little as 10% of the total solids. In actual practice on a large scale it has worked out in one plant so that the flue dust is slightly over 25% of the total solids. The indications are strong, however, that as time goes on and the full features of the material are taken advantage of, the percentage used in this operation will increase to approximately 40%. The point is that cement-asbestos products for different uses vary widely in strength requirements and therefore, the amount of filler varies widely. The percentages above stated have reference to the percentages by weight of the total solids in any given composition.

The compositions particularly adaptable for use in making cement-asbestos products preferably will be within the following range of percentages:

| | Percent |
|---|---|
| Portland cement | Approxmately 45–70 |
| Cement mill flue dust | Approximately 10–45 |
| Asbestos fibres | Approximately 5–20 |

As an example of a specific composition suitable for making cement asbestos shingles and like products may be mentioned the following:

| | Percent |
|---|---|
| Portland cement | Approximately 60 |
| Cement mill flue dust | Approximately 25 |
| Asbestos fibres | Approximately 15 |

Where my invention is to be applied to the wet process of making products of the class set forth, the aforementioned substances within the percentage range indicated are to be made up into a slurry in an excess of water. Preferably, such slurry should contain approximately 8% of solids consisting of asbestos fibres, Portland cement and cement mill flue dust within the percentages by weight above mentioned.

What I claim is:

1. The method of making cement-asbestos products containing a filler material, said method comprising controlling the setting or hardening of the products by using cement mill flue dust as the filler material.

2. The method of making cement-asbestos products containing cement mill flue dust as a filler material, said method comprising controlling the setting or hardening of the products by varying the proportion of the cement mill flue dust in the products.

3. A cement-asbestos product comprising hydraulic cement, asbestos fibres and cement mill flue dust as a filler material.

4. A composition of matter suitable for making cement-asbestos products comprising a thorough mixture of Portland cement, asbestos fibres and cement mill flue dust.

5. A composition of matter suitable for making cement-asbestos products comprising a slurry containing a thorough mixture of Portland cement, asbestos fibres and cement mill flue dust in an excess of water.

6. A composition of matter suitable for making cement-asbestos products comprising a water slurry containing approximately 8% solids consisting of a thorough mixture of asbestos fibres, Portland cement and cement mill flue dust.

7. A composition of matter suitable for making cement-asbestos products comprising a thorough mixture of from approximately 45 to 70% Portland cement, from approximately 5 to 20% asbestos fibres and from approximately 10 to 45% cement mill flue dust, the percentages being by weight.

8. A composition of matter suitable for making shingles or like products comprising a thorough mixture of the following constituents by weight:

| | Percent |
|---|---|
| Portland cement | Approximately 60 |
| Cement mill flue dust | Approximately 25 |
| Asbestos fibres | Approximately 15 |

PHILIP MOONEY.